(12) United States Patent
Yang et al.

(10) Patent No.: US 10,489,363 B2
(45) Date of Patent: Nov. 26, 2019

(54) DISTRIBUTED FP-GROWTH WITH NODE TABLE FOR LARGE-SCALE ASSOCIATION RULE MINING

(71) Applicant: Futurewei Technologies, Inc., Plano, TX (US)

(72) Inventors: Kai Yang, Bridgewater, NJ (US); Tao Quan, Shanghai (CN); Yanjia Sun, Downingtown, PA (US)

(73) Assignee: Futurewei Technologies, Inc., Plano, TX (US)

( * ) Notice: Subject to any disclaimer, the term of this patent is extended or adjusted under 35 U.S.C. 154(b) by 405 days.

(21) Appl. No.: 15/298,052

(22) Filed: Oct. 19, 2016

(65) Prior Publication Data
US 2018/0107695 A1 Apr. 19, 2018

(51) Int. Cl.
*G06F 16/215* (2019.01)
*G06F 16/22* (2019.01)
(Continued)

(52) U.S. Cl.
CPC ........ *G06F 16/215* (2019.01); *G06F 16/2246* (2019.01); *G06F 16/2282* (2019.01);
(Continued)

(58) Field of Classification Search
CPC ........ G06F 17/30327; G06F 17/30873; G06F 16/2246; G06F 16/284; G06F 9/3806;
(Continued)

(56) References Cited

U.S. PATENT DOCUMENTS

| 6,665,669 B2 | 12/2003 | Han et al. |
| 7,433,879 B1 | 10/2008 | Sharma et al. |
| (Continued) | | |

FOREIGN PATENT DOCUMENTS

| CN | 101996102 A | 3/2011 |
| CN | 105183875 A | 12/2015 |

OTHER PUBLICATIONS

Han et al. "Mining Frequent Patterns without Candidate generation: A Frequent-Pattern Tree Approach", Data Mining and Knowledge Discovery, 2004.*
(Continued)

*Primary Examiner* — Yuk Ting Choi
(74) *Attorney, Agent, or Firm* — Vierra Magen Marcus LLP

(57) ABSTRACT

The disclosure relates to technology for mining data in a database by recursively mining a conditional frequent pattern tree (FP-tree) for frequent items of each conditional pattern base for each node in an FP-tree to obtain frequent patterns. For each branch in the FP-tree, a single-item node table (NT) is generated for which a selected one of the frequent items appears in the node of the branch. The single-item NT including a list of all of the frequent items appearing in the FP-tree and a corresponding frequent item count. For each single-item NT of each branch generated for the selected one of the frequent items, the frequent item count of each frequent item is summed in the single-item NT formed for each branch to generate a combined single-item NT, and association rules based on the frequent patterns are generated for each of the frequent items and the combined single-item NT.

25 Claims, 12 Drawing Sheets

(51) Int. Cl.
  *G06F 16/2458* (2019.01)
  *G06F 16/2455* (2019.01)
  *G06N 5/02* (2006.01)
(52) U.S. Cl.
  CPC .... *G06F 16/2465* (2019.01); *G06F 16/24566* (2019.01); *G06N 5/025* (2013.01)
(58) Field of Classification Search
  CPC .. G06F 16/285; G06F 11/0751; G06F 11/079; G06N 5/025; G10L 2015/088
  See application file for complete search history.

(56) References Cited

U.S. PATENT DOCUMENTS

| | | | |
|---|---|---|---|
| 7,953,685 B2 | 5/2011 | Liu et al. | |
| 2003/0028531 A1* | 2/2003 | Han | G06F 17/30327 707/999.006 |
| 2007/0250522 A1* | 10/2007 | Perrizo | G06K 9/6282 707/999.101 |
| 2010/0179955 A1 | 7/2010 | Wu et al. | |
| 2015/0304191 A1* | 10/2015 | Groenendijk | H04L 41/5032 370/252 |
| 2016/0063090 A1* | 3/2016 | Plevyak | G06F 17/30979 707/740 |
| 2016/0212158 A1* | 7/2016 | Gao | H04L 63/1416 707/740 |

OTHER PUBLICATIONS

HonG et al. "Incrementally fast updated frequent pattern tree", Expert Systems with Applications, 2008.*
Li at al., "PFP: Parallel FP-Growth for Query Recommendation" Proceedings of the 2008 ACM Conference on Recommender Systems, RecSys 2008, Lausanne, Switzerland, Oct. 23-25, 2008, 8 pages.
PCT/CN2017/106717, ISR, Jan. 16, 2018.

* cited by examiner

| KPI | KQI | support | confidence | lift |
|---|---|---|---|---|
| [UL_PACKETLOST_RATIO>0.14327440341996661] | [98248.38>==WEBDISPLAYRATE>=3547] | 3661 | 0.858986 | 3.905782 |
| [AVG_DW_RTT>2237.1039131332] | [98248.38>==WEBDISPLAYRATE>=3547] | 8081 | 0.585113 | 2.660491 |
| [PAGE_DISPLAY_DELAY>81368.5833464624] | [98248.38>==WEBDISPLAYRATE>=3547] | 12474 | 0.572307 | 2.60226 |
| [RSCP<-154.34776603771] | [98248.38>==WEBDISPLAYRATE>=3547] | 183 | 0.389362 | 1.770415 |
| [SYN2SYNACK_DELAY>220.38607044774297] | [98248.38>==WEBDISPLAYRATE>=3547] | 566 | 0.324727 | 1.476525 |
| [1683.5779>=AVG_DW_RTT>=1130.052] | [98248.38>==WEBDISPLAYRATE>=3547] | 6828 | 0.318411 | 1.447803 |
| [SYNACK2ACK_DELAY>3002.7327141254] | [98248.38>==WEBDISPLAYRATE>=3547] | 3415 | 0.29585 | 1.345221 |
| [ACK2GET_DELAY>2812.3191471576] | [98248.38>==WEBDISPLAYRATE>=3547] | 2217 | 0.255415 | 1.161362 |

*FIG. 9*

| KPI | KQI | support | conf | lift | num_Dimension |
|---|---|---|---|---|---|
| [SYNACK2ACK_DELAY>3002.7324,AVG_DW_RTT>2237.103] | [98248.38>=WEBDISPLAYRATE>=35.47] | 754 | 0.832 | 3.784 | 2 |
| [UL_PACKETLOST_RATIO>0.14321,0<SYNACK2ACK_DELAY<761.183,50001<PAGESIZE<1015974.7500] | [98248.38>=WEBDISPLAYRATE>=35.47] | 2481 | 0.928 | 4.223521 | 3 |
| [PAGE_DISPLAY_DELAY>81368.5834,0.0717>=UL_PACKETLOST_RATIO>=0.0359,0<SYNACK2ACK_DELAY<761.183,0<SYN2SYNACK_DELAY<55.846,50001<PAGESIZE<1015974.750] | [98248.38>=WEBDISPLAYRATE>=35.47] | 3222 | 1 | 4.546 | 5 |

DISTRIBUTED FP-GROWTH WITH NODE TABLE FOR LARGE-SCALE ASSOCIATION RULE MINING

BACKGROUND

Given modern computing capabilities, it is relatively easy to collect and store massive amounts of data, such as facts, numbers, text, etc. However, how to analyze these massive amounts of data to determine important data from less important data remains a key issue. One technique for making such a determination is data mining. Data mining is the process of finding interesting patterns in data from a very large database, such as a database or data store describing existing, past, or potential clients that may have thousands of attributes.

Conventional data mining techniques do not work well on a database with a large number of attributes. In particular, most conventional data mining techniques work on data in memory. If the data is so large that it must be stored in a place other than memory, the data mining techniques will move data into memory to operate on the data, which is inefficient both in terms of memory usage and time.

The fairly recent automation of data collection and the growth in the number of information repositories have given rise to numerous data stores, ranging from those of large scientific organizations, banks and insurance companies, to those of small stores and businesses. The massive amounts of data has required the use of advanced and complicated data warehousing and mining techniques to summarize and make use of the data. As the complexity and size of the data increases, more efficient mining techniques becoming increasingly valuable.

BRIEF SUMMARY

In one embodiment, there is a method for mining data in a database, comprising recursively mining a conditional frequent pattern-tree (FP-tree) for frequent items of each conditional pattern base for each node in an FP-tree to obtain frequent patterns for each of the frequent items; generating, for each branch in the FP-tree, a single-item node table for each of the frequent items in the FP-tree for which a selected one of the frequent items appears in the node of the branch, the single-item node table including a list of all of the frequent items appearing in the FP-tree and a corresponding frequent item count; for each single-item node table of each branch generated for the selected one of the frequent items, summing the frequent item count of each frequent item in the single-item node table formed for each branch to generate a combined single-item node table; and generating association rules based on the frequent patterns for each of the frequent items and the combined single-item node tables.

In another embodiment, there is a non-transitory computer-readable medium storing computer instructions for mining data in a database, that when executed by one or more processors, perform the steps of recursively mining a conditional frequent pattern-tree (FP-tree) for frequent items of each conditional pattern base for each node in an FP-tree to obtain frequent patterns for each of the frequent items; generating, for each branch in the FP-tree, a single-item node table for each of the frequent items in the FP-tree for which a selected one of the frequent items appears in the node of the branch, the single-item node table including a list of all of the frequent items appearing in the FP-tree and a corresponding frequent item count; for each single-item node table of each branch generated for the selected one of the frequent items, summing the frequent item count of each frequent item in the single-item node table formed for each branch to generate a combined single-item node table; and generating association rules based on the frequent patterns for each of the frequent items and the combined single-item node tables.

In still another embodiment, there is a node for mining data, comprising a data store including data having a number of items; a mining application to mine the data in the data store to identify frequent items, the mining application stored in a non-transitory memory as instructions; one or more processors in communication with the non-transitory memory, wherein the one or more processors execute the instructions to: recursively mine a conditional frequent pattern-tree (FP-tree) for frequent items of each conditional pattern base for each node in an FP-tree to obtain frequent patterns for each of the frequent items; generate, for each branch in the FP-tree, a single-item node table for each of the frequent items in the FP-tree for which a selected one of the frequent items appears in the node of the branch, the single-item node table including a list of all of the frequent items appearing in the FP-tree and a corresponding frequent item count; for each single-item node table of each branch generated for the selected one of the frequent items, sum the frequent item count of each frequent item in the single-item node table formed for each branch to generate a combined single-item node table; and generate association rules based on the frequent patterns for each of the frequent items and the combined single-item node tables.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 9 illustrates an example association rule table with multiple consequents.

DETAILED DESCRIPTION

The disclosure relates to technology for mining transactional data stored in a database by learning association rules for massive amounts of data using a modified FP-growth mechanism. Applying the techniques of this disclosure, redundant rules appearing in the learned association rules may also be detected and removed to increase efficiency and reduce computational time. Moreover, association rules containing multiple consequents may be learned from the original set of rules containing a single consequent that were generated during the data mining process. Processing the massive amounts of data using the modified FP-growth mechanism provides a distributed implementation that avoids having to post-process frequent item sets to obtain the association rules.

In one embodiment, a conditional FP-tree is recursively mined for frequent items of a conditional pattern base for each node in an FP-tree. The mining results in obtaining frequent patterns for each of the frequent items. For each branch in the FP-tree, a single-item node table is then generated for each of the frequent items in the FP-tree for which a selected one of the frequent items appears in the node of the branch. The single-item node tables are combined by summing the frequent item count of each frequent item in the single-item node tables to generate a combined single-item node table. Applying the frequent patterns obtained during mining and the associated combined single-item node table for each of the frequent items, association rules may be generated. In one example, the association rules may be applied to determine a root cause analysis of anomalies detected in networks.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

Figure 1:
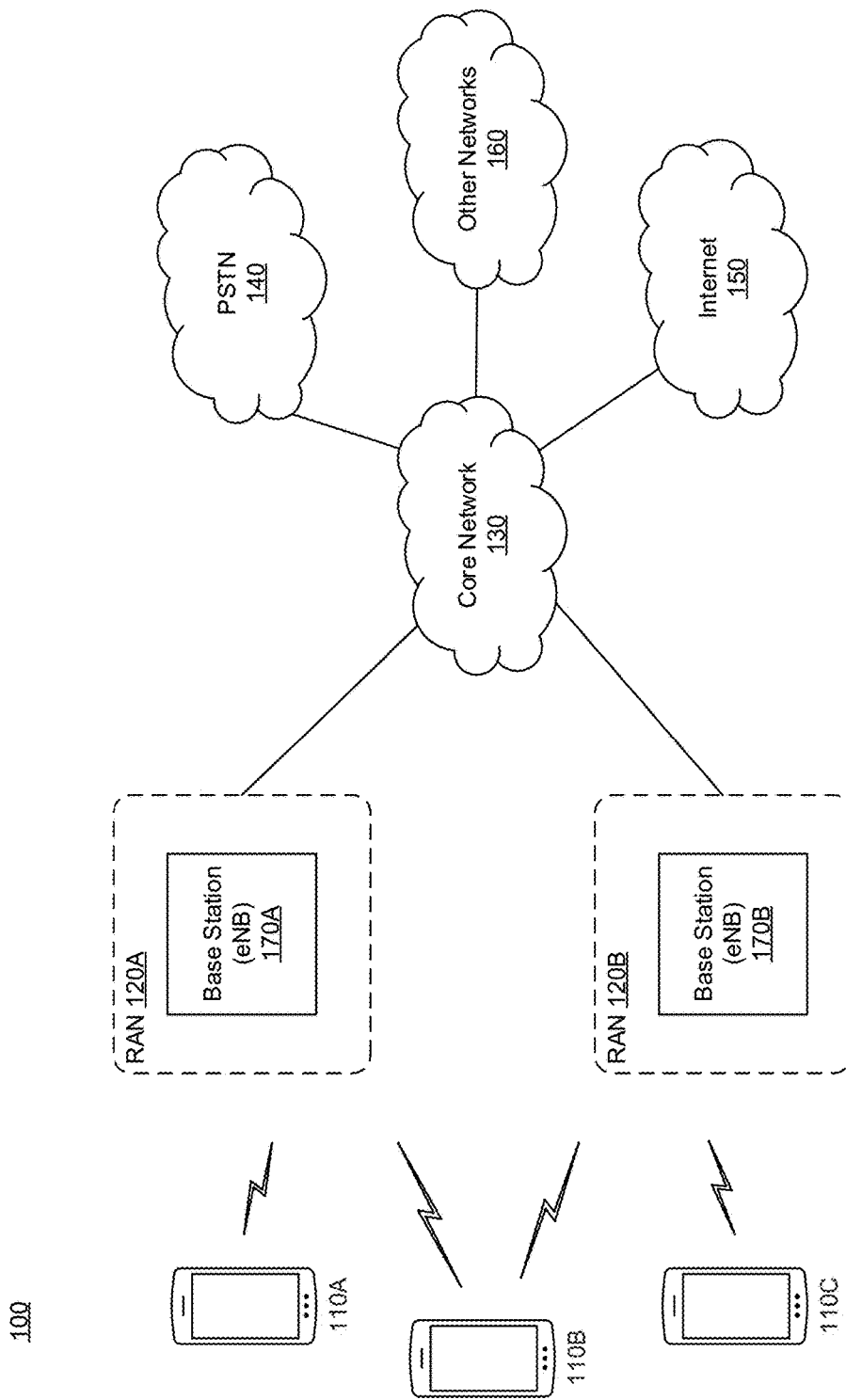
FIG. 1 illustrates a cellular communication system in accordance with one embodiment.

FIG. 1 illustrates a wireless network for communicating data. The communication system 100 includes, for example, UE 110A-110C, radio access networks (RANs) 120A-120B, a core network 130, a public switched telephone network (PSTN) 140, the Internet 150, and other networks 160. While certain numbers of these components or elements are shown in the figure, any number of these components or elements may be included in the system 100.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The UEs 110A-110C are configured to operate and/or communicate in the system 100. For example, the UEs 110A-110C are configured to transmit and/or receive wireless signals or wired signals. Each UE 110A-110C represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include base stations 170A, 170B (collectively, base stations 170), respectively. Each of the base stations 170 is configured to wirelessly interface with one or more of the UEs 110A, 110B, 110C (collectively, UEs 110) to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the UEs 110 over one or more air interfaces (not shown) using wireless communication links. The air interfaces may utilize any suitable radio access technologies.

It is contemplated that the system 100 may use multiple channel access functionality, including for example schemes in which the base stations 170 and UEs 110 are configured to implement the Long Term Evolution wireless communication standard (LTE), LTE Advanced (LTE-A), and/or LTE Broadcast (LTE-B). In other embodiments, the base stations 170 and UEs 110 are configured to implement UMTS, HSPA, or HSPA+standards and protocols. Of course, other multiple access schemes and wireless protocols may be utilized.

The RANs 120A-120B are in communication with the core network 130 to provide the UEs 110 with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

It is also appreciated that the term UE may refer to any type of wireless device communicating with a radio network node in a cellular or mobile communication system. Non-limiting examples of a UE are a target device, device-to-device (D2D) UE, machine type UE or UE capable of machine-to-machine (M2M) communication, PDA, iPAD, Tablet, mobile terminals, smart phone, laptop embedded equipped (LEE), laptop mounted equipment (LME) and USB dongles.

Moreover, while the embodiments are described in particular for downlink data transmission scheme in LTE based systems, they are equally applicable to any radio access technology (RAT) or multi-RAT system. The embodiments are also applicable to single carrier as well as to multicarrier (MC) or carrier aggregation (CA) operation of the UE in which the UE is able to receive and/or transmit data to more than one serving cells using MIMO.

Figure 2:
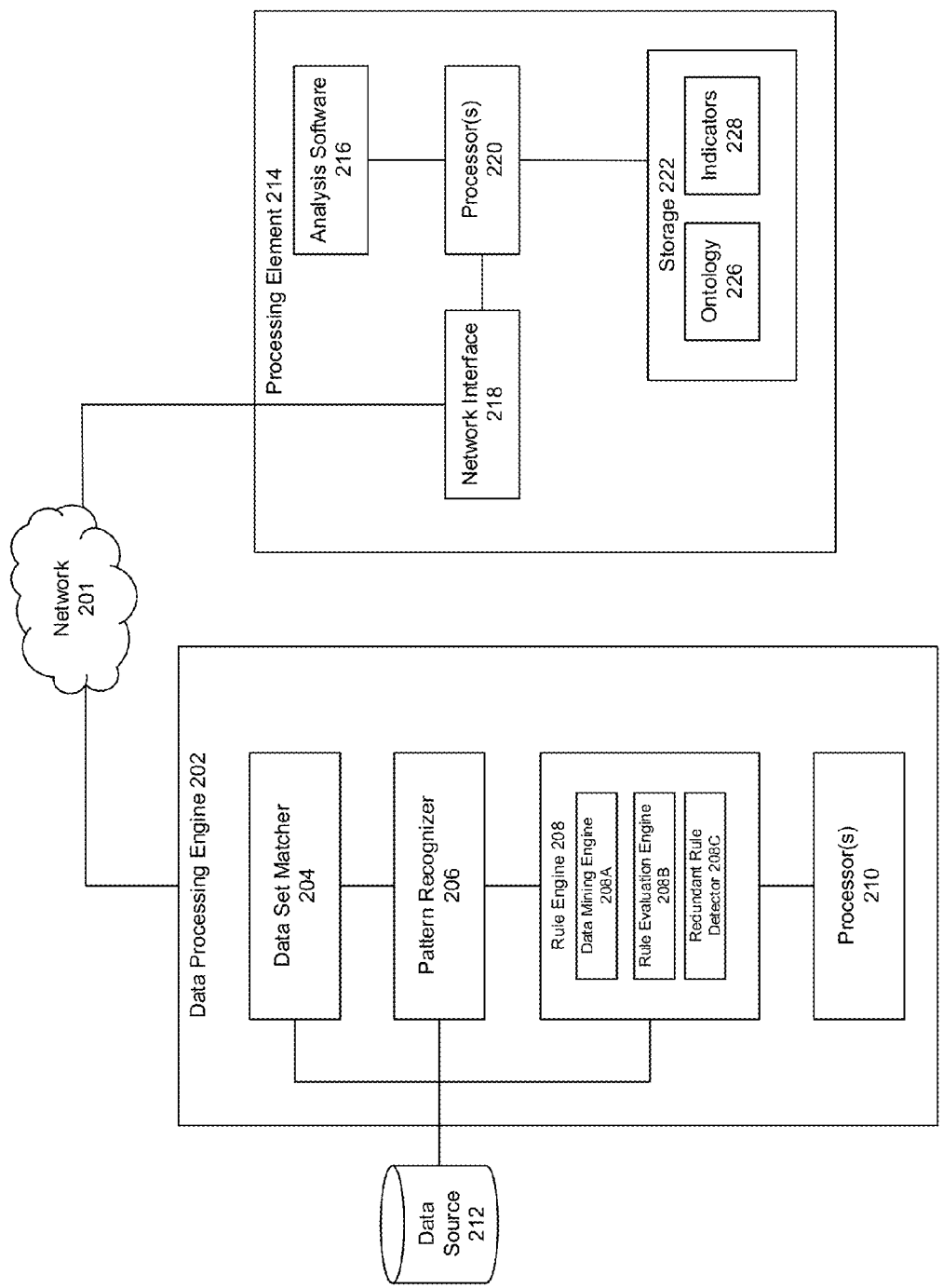
FIG. 2 illustrates an example system for processing and analyzing data sets.

FIG. 2 illustrates an example system for processing and analyzing data sets. The system includes, for example, a data processing engine 202 coupled to a data source 212 (which may be any form of storage or storage system) and a computer 214 coupled to network 201. The system may also include an input device (not shown) where one or more conditions or parameters of the association rules to be mined may be input. For example, the input device may be used to input the threshold conditions (e.g., thresholds for lift, support, confidence, etc., as well as the type of algorithm to implement) for the association rule to be mined. In one embodiment, the system is part of or in communication with the wireless communication network 100 (FIG. 1). Thus, networked base stations 170, UEs 110 and the like may access the data processing engine 202 and computer 214.

The data processing engine 202 includes, for example, a data set matcher 204, pattern recognizer 206, rule engine 208 and processor(s) 210. The data processing engine may execute, for example, computer instructions stored in memory (not shown) via processor(s) 210 to match data, recognize data patterns and execute various rules to analyze the data, as described in more detail below.

The data set matcher 204 may be included for mapping first data or a first data set to second data or a second data set after the data from each set has been grouped and/or categorized. The data set matcher 204 may also transform groups of data in the data set to provide categories that describe and label the group.

For example, a group of a first data set may include values that demonstrate poor QoS over a defined time period. The group may then be categorized as a "poor" QoS or identified as representing a certain percentage of the QoS (e.g., the poor QoS category represents 5% of the data or data set). Similarly, another group of a second data set may include values that demonstrate poor performance over a defined time period. This group may be categorized as a "poor" performance category or identified as representing a certain percentage of the performance (e.g., the poor performance category represents 10% of the data or data set). The data set matcher 204 may then match or associate or map the data or groups of data having a cell ID (over a time interval) for which the groups have the same categorization (e.g., poor).

The data processing engine 202 may also include a pattern recognizer 206 to identify frequent patterns occurring in the first and second sets of data stored in the data source 212. In the disclosed embodiments, the patterns are recognized from the data and data sets stored in the data source 212. For example, the pattern recognizer 206 may use an apriori algorithm, eclat algorithm or FP-Growth technique to identify frequent patterns in the data stored in the database 212. The detected patterns may, for example, demonstrate a relationship between key quality indicators (KQIs) and key performance indicators (KPIs).

The pattern recognizer 206 may also be responsible for generating frequent patterns for analysis by the rule engine 208, and in particular the data mining engine 208A. However, it is appreciated that the data sets may be generated, and patterns detected, in real-time. Moreover, the data sets may be collected and retrieved from any network component, such as the UEs 110 or base stations 170, and are not limited to collection and storage in the data source 212.

In one embodiment, the pattern recognizer 206 may determine if patterns are becoming more or less frequent over time. For example, applying a shorter time interval for determining pattern frequency generally increases the weighting of recent pattern frequency, but typically lowers the amount of statistical significance to the data. Conversely, using longer time periods for determining pattern frequency yields more statistical confidence in the data, but decreases the accuracy due to the inclusion of older pattern frequency data. Thus, in one embodiment, the pattern recognizer 206 may evaluate different time intervals to recognize different time slices of data generated across the network.

The rule engine 208 is responsible for generating association rules from the pattern information determined by pattern recognizer 206, and includes a data mining engine 208A and rule evaluation engine 208B (described below). The pattern recognizer 206 may be part of the rule engine 208 and/or implemented independently (as depicted). Thus, in one embodiment, the database 212 may be connected to rule engine 208, the pattern recognizer 206 and/or the data set matcher 204. In another embodiment, collected data or data from the database 212 may be matched by the data set matcher 204, passed to the pattern recognizer 206 for processing to identify patterns, and then passed to the rule engine 208 for rule generation.

The data mining engine 208A may implement one or more data mining functions or algorithms that analyze data to produce the data mining models. For example, similar to the pattern recognizer 206, the data mining engine 208A may also utilize a data mining association rules algorithm, such as the apriori, eclat and FP-growth algorithms, to generate data rules from the data sets. The data mining engine 208A may also be implemented using any well-known techniques, and is not limited to implementation of the aforementioned algorithms.

In one embodiment, the algorithms may produce an association rule model as defined in the predictive model markup language (PMML) standard. The association rule model represents rules where some set of data is associated to another set of data. For example, a rule can express that a certain QoS (KQI) level often occurs in combination with a certain set of performance (KPI) levels. For example, the association algorithm may receive as an input cell identifiers (IDs) (and associated timestamps) along with corresponding KQI and KPI values. The association algorithm may then search for relationships between the KQI at each cell ID and the KPIs at the associated timestamps.

The data mining engine 208A then uses the association rule algorithm to generate data rules that satisfy the specified metrics, such as lift, support and confidence.

The generated data rules may then be loaded to a rule evaluation engine 208B which executes the rules against selected tables and records from the data source 212, capturing results and analysis. That is, the data records in the data source 212 may be processed by the rule evaluation engine 208B applying the data rules to determine data records that have values that deviate from the values that are expected by the rules.

During rule analysis, a redundant rule detector 208C can detect and remove or eliminate a rule that is redundant. For example, the redundant rule detector may be a filter that removes or eliminates rules that are the same or have the same meaning, or may remove or eliminate rules from an association rule set (for example, association rules stored in a table of a database) to reduce the number of entries in the table. Rule redundancy will be discussed in more detail below.

The computer 214 includes analysis software 216, network interface 218, processor(s) 220 and storage 222, including ontology 226 and indicators 228 that may be stored therein. The analysis software 216 may analyze the data received from the data source 212 and/or data processing engine 202 via network 201. The data may include, for example, any data useful in analyzing quality of service and performance levels in the network 100, such as indicators 228 (e.g., KQIs and KPIs).

The analysis software 214 may be executable by the processor(s) 220, which is (are) connected through a network interface 218 to the network 201 to allow the computer 214 to communicate over the network 201. Although shown as a single block, it is understood that the computer 214 can refer to either a single computer node or to multiple computer nodes.

The analysis software 216 implements the association rule learning referred to above and analyzes the data associated with network entities to construct a probabilistic network structure or tree, such as a Bayesian network, that identifies relationships between the data in the network 100. In one embodiment, the constructed probabilistic network is stored in the storage 222. Moreover, the probabilistic network may continually update its model (expressed as a structure or tree) of the network 100 based on continued receipt of data over time.

The analysis software 216 may also be executed to construct inferences based on the frequency of data and recognized patterns as elicited, for example, from pattern recognizer 206. In one embodiment, the relationships between data and data sets can be inferred from the frequency and occurrence of the data as detected by sensors and/or monitoring agents throughout the network 100.

In addition, to assist in constructing the probabilistic network, an ontology (or data tree or data structure) 226 may also be created and stored in the storage 222. The ontology is a structured, machine-readable data model. The ontology 226 models the concepts of the domain being analyzed, in this example the network 100. The ontology 226 forms a structure between data collected from the domain or network (and relationships between the data, such as the KQIs and KPIs). The ontology 226 may then serve as a structure detailing the network to enable the construction of probabilistic network.

In the process of learning the probabilistic network, analysis is performed of the frequency of the incoming data or indicators 228, which may be categorized into groups, over a period of time. Based on the analyzed indicators 228, the probabilistic network is able to determine the likelihood that different indicators 228 are related and also determine the type of relationship (e.g., whether it is a cause or an effect relationship). For example, what is the relationship between a KPI and a KQI such that when the KPI occurs a degradation in the KQI also occurs.

It is also appreciated that while data processing engine 202 and computer 214 are illustrated as separate network components, they may reside on the same component or device.

Once the probabilistic network is trained (learned), the probabilistic network can be used to make predictions. For example, the probabilistic network can predict if an indicator such as KPI will impact the quality of an associated KQI.

Figure 3:
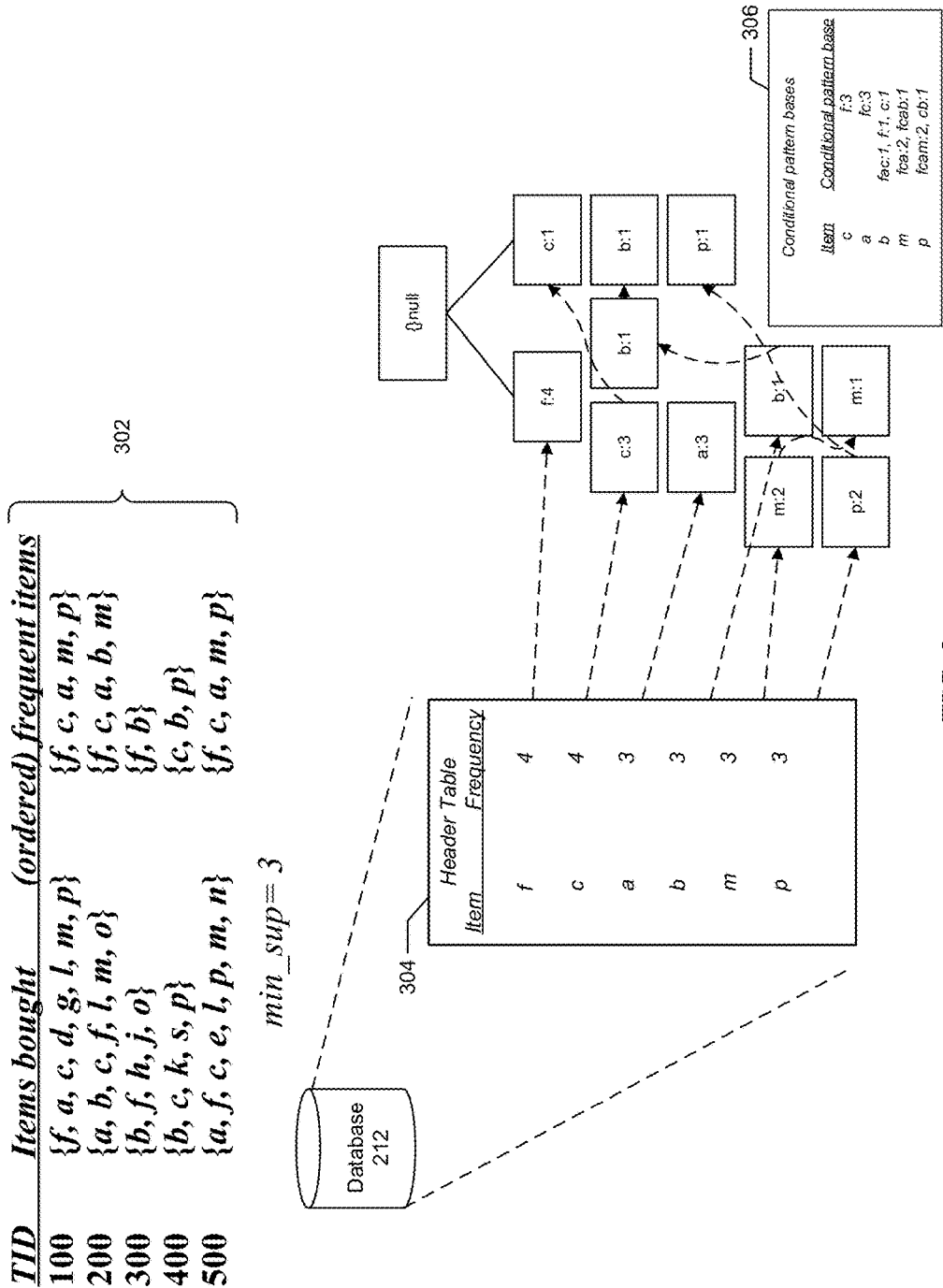
FIG. 3 illustrates an example of constructing a frequent pattern tree from transactions in a data source.

FIG. 3 illustrates an example of constructing a frequent pattern tree from transactions stored in a database. In one embodiment, an FP-growth algorithm is used for mining frequent item sets in the transactions 302 stored in the database 212. A server or node, such as base station 170A or 170B with a processing engine 202, begins the process of constructing an FP-tree by retrieving the item descriptors from the transaction database 212 and a minimum support count (e.g., min_sup=3). The node 170A/B then performs a first scan of the database 212 to obtain the frequency count of each item. For all items in the database 212 with a frequency meeting or exceeding the minimum support count (e.g., min_sup=3), a header table 304 is constructed that contains the item (e.g., item T) and its frequency count (e.g., 4). As illustrated, the entries in the header table 304 are sorted in decreasing frequency order.

Once the header table 304 is completed, the node 170A/B performs a second scan of the transaction database 212 to build an FP-tree identifying the frequent patterns. As will be understood by those of ordinary skill in the art, as a preliminary step, the frequent items for each transaction contained in a database entry (e.g., items f, a, c, d, g, l, m and p in transaction index (TID) 100) are sorted based on the item order of the header table 304. In the example of FIG. 1, with the header table 304 order being "f, c, a, b, m, p," the items in entry TID 100 are sorted and stored in the database 212 as "f, c, a, m, p." Next, the transactions with identical item sets are merged in the FP-tree by incrementing the counter values for the merged item set. Finally, the FP-tree is constructed so that transactions with the same prefix share the same path in the tree.

Construction of the FP-tree, with reference to the entries in the transaction database 212, is illustrated in FIG. 3. To build the FP-tree, a data structure is stored in memory that identifies a root or head of the tree (labeled "{ }null"). The FP-tree in the data structure is constructed by defining various nodes (e.g., node f:4, c:3, b:1, a:3, etc.) and branches (one branch beginning at node f:4 and the another branch beginning at node c:1) that connect to the root (in the example, { }null) of the tree. For example, configuring the FP-tree begins with accessing the data structure stored in memory to identify the root. For the first item 'f' of the sorted items in the database, a link from the root node "{ }null" to a first node 'f' in the FP-tree is created that includes a counter 4 which keeps track of the number of transactions that share that node. As appreciated, when the first node 'f' is formed, the initial counter value is set to 1. Next, a link field (not shown) is added to the header table 304 for storing a pointer that points to node(s) for that item using a chain of node links. As the process of creating the FP-tree is well understood by the skilled artisan, a full description of constructing the FP-tree will not be discussed herein.

Once the FP-tree is completed, the FP-tree may be used to locate frequent patterns that contain the frequent items by following the node links of the items in the header table. For example, to find all frequent patterns containing item 'c,' a link in the header table 304 that points to node c:3, which includes a pointer to node c:1.

The created frequent patterns may be mined, for example using an FP-growth algorithm, from a transaction database by finding all of the prefix paths involving a particular item (a "conditional pattern base" for each item). By treating these paths as a set of transactions, a conditional FP-tree (FIG. 4) can be built from them by recursively invoking the FP-growth algorithm to mine frequent patterns on this conditional FP-tree. An example of a conditional pattern base is depicted in the conditional pattern base table 306. As will be appreciated, an FP-tree with a single path does not have to be recursively mined since its frequent patterns correspond to an enumeration of all combinations of items in the prefix path.

Figure 4:
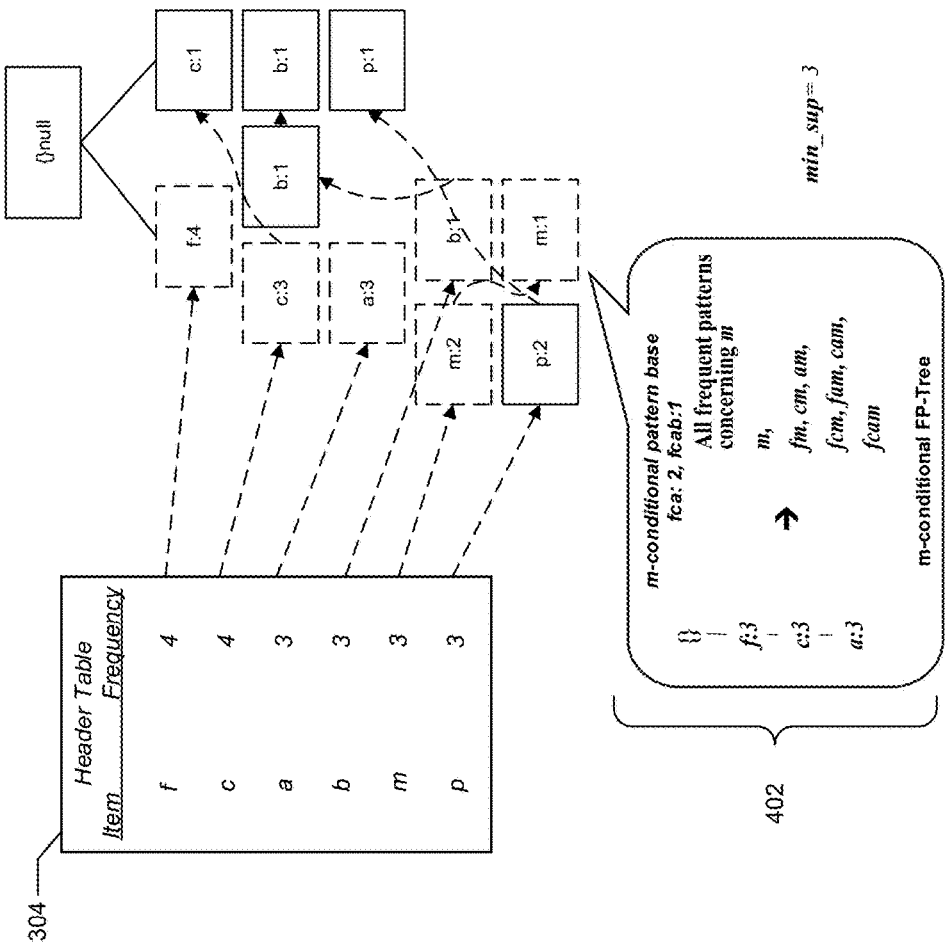
FIG. 4 illustrates construction of a conditional FP-tree based on conditional pattern bases of FIG. 3.

FIG. 4 illustrates construction of a conditional FP-tree based on conditional pattern bases of FIG. 3. The header table 304 and FP-tree are the same as those constructed in FIG. 3. The FP-tree nodes with a dotted line (e.g., f:4, c:3, a:3, m:2, b:1 and m:1) represent the conditional FP-tree where the conditional pattern base is for 'm.' For the example, with reference to header table 304, item 'm' has a frequency of 3. Thus, with reference to numeral 402, the conditional pattern bases {(f:2, c:2, a:2), (f:1, c:1, a:1, b:1)} may be generated for item 'm.' More specifically, the conditional FP-tree may be generated by treating the m-conditional pattern base as a database and each prefix path as a record. This results in the frequent items (f:3, c:3, a:3), which are used to construct the m-conditional FP-tree. It is appreciated that each of the items appearing in the conditional FP-tree may be used to form an item specific conditional pattern base and conditional FP-tree, although item 'm' is being used in the non-limiting example embodiment.

Once the m-conditional FP-tree is constructed, the conditional FP-tree is mined for frequent patterns which include 'm.' As illustrated in the callout of numeral 402, mining the m-conditional FP-tree involves mining items 'a,' 'c' and 'f.' Mining of the items results in a set of frequent patterns involving item 'm' as: m:3, am:3, cm:3, fm:3, cam:3, fam:3, fcam:3, and fcm:3.

Figure 5:
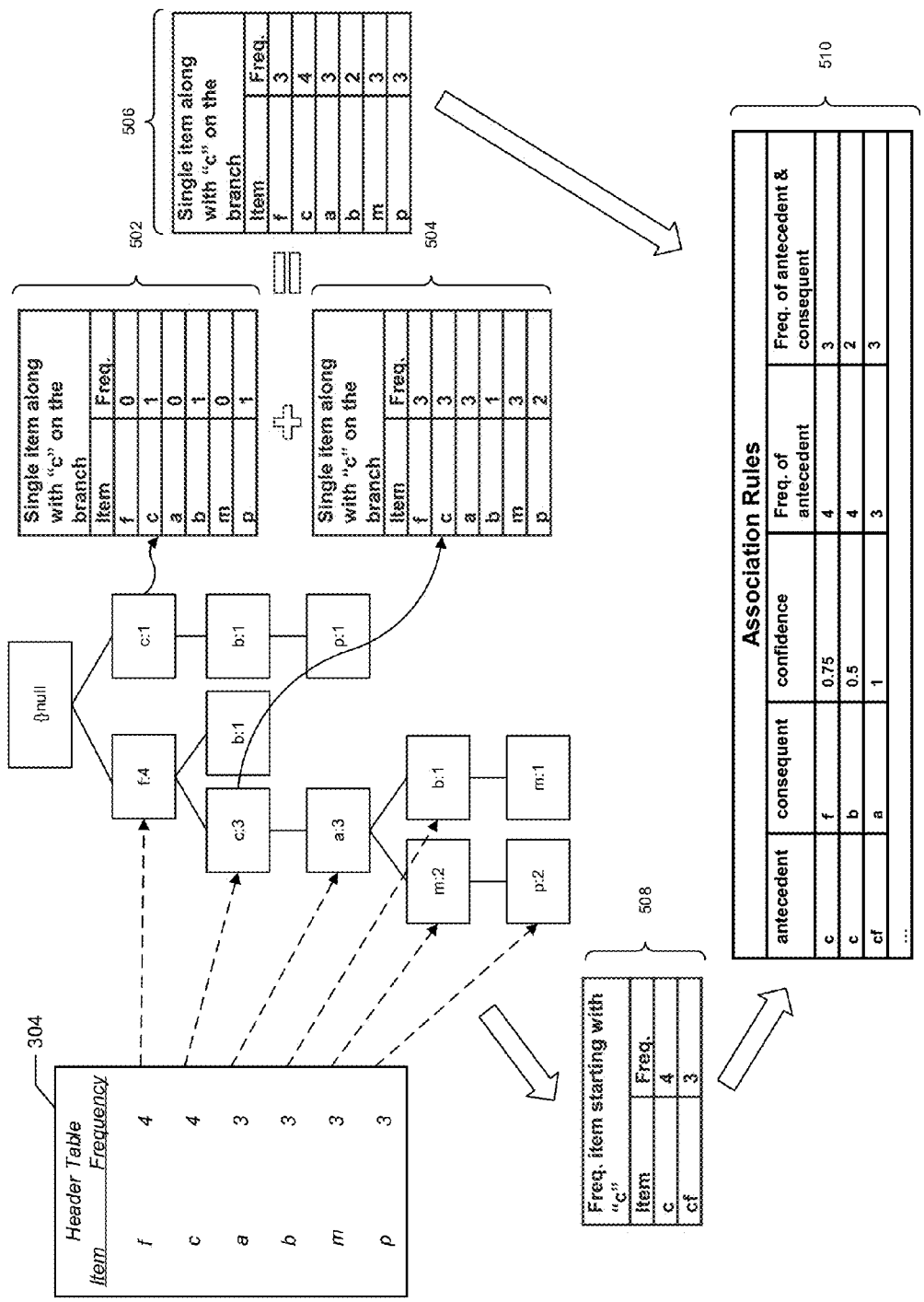
FIG. 5 illustrates processing of transaction data to generate association rules.

FIG. 5 illustrates processing of transaction data to generate association rules. In the description that follows, the data processing engine 202 may implement the procedures. The data processing engine 202 may be an independent component on the network or included as part of any network component, such as base station 170A/B. Moreover, the implementation is not limited to implementation by the data processing engine 202. For example, any network component (such as those depicted in FIGS. 1, 2 and 11) may be responsible for implementing the disclosed procedures.

After the FP-tree is constructed by the processing engine 202, the FP-tree may be mined for specific patterns with respect to the identified frequent items. The FP-tree may be mined using various data mining algorithms. For example, conditional (pre-fix) based mining operations may be performed using the FP-tree. For each frequent item, the mining process constructs a conditional pattern base (e.g., a "sub-database" which consists of the set of prefix paths in the FP-tree co-occurring with the suffix pattern (FIG. 4)). After constructing the conditional FP-tree, the conditional FP-tree is recursively mined according to the identified frequent items.

For example, processing frequent item 'c' (in a manner similar to item 'm' in FIG. 4) yields the frequent pattern c:4 and the conditional pattern base f:3. This yields the additional frequent pattern of: 3. Frequency item table 508 shows the results of processing frequent item 'c' and contains item 'c' with a frequency of 4 and item 'c' with a frequency of 3.

In addition to the frequent item table 508, the processing engine 202 generates a single-item node table, such as single-item node tables 502 and 504, for each of the frequent items along a branch in the FP-tree. That is, for each branch in the FP-tree (for example, the branch beginning with node f:4 and the branch beginning with node c:1), a single-item node table (such as single-item node tables 502 and 504 in FIG. 5) is generated by the processing engine 202. The single-item node tables 502 and 504 are generated for each of the frequent items (for example, frequent items f, c, a, b, m, p) in the FP-tree for which a selected one of the frequent items (such as frequent item 'c' in FIG. 5) appears in the node of the branch (in this example, branches beginning with nodes f:4 and c:1).

Each of the generated single-item node tables 502 and 504 includes a list of all of the frequent items (frequent items f, c, a, b, m, p) appearing in the FP-tree and a corresponding frequent item count (for example, in single-item table 502, frequent item T has a frequent item count of 0, and in single-item table 504, frequent item T has a frequent item count of 3).

Once each of the single-item node tables 502 and 504 (for each of the frequent items appearing in each branch) have been generated at 704, the frequent item count for the same frequent item in each of the single-item node tables 502 and 504 is summed to generate a combined single-item node table at 706.

For example, for frequent item 'c' in header table 304, a single-item node table is generated for each branch f:4 and c:1 when the frequent item 'c' appears in the respective branch. In the example of single-item tables 502 and 504, frequent item 'c' appears in both branches of the FP-tree. Accordingly, single-item node tables 502 and 504 are generated for each branch of the FP-tree.

For branch c:1, the single-item node table 502 shows each of the frequent items f, c, a, b, m, p in a first column with an associated frequency count in a second column. In the example of single-item node table 502, item T has a frequency count of 0, item 'c' has a frequency count of 1, item 'a' has a frequency count of 0, item 'b' has a frequency count of 1, item 'm' has a frequency count of 0 and item 'p' has a frequency count of 1. A similar single-item node table may be generated for frequent item 'c' for the branch f:4, as illustrated in single-item node table 504.

Once the single-item node tables 502 and 504 are generated for each of the frequent items, they are combined to form a single-item node table 506. The combined single-item node table 506 contains a list of each frequent item f, c, a, b, m, p along with a combined frequency count for each of the frequent items. That is, the frequency count in the combined single-item node table 506 for each of the frequent items is a sum of the frequency count for that particular frequent item appearing in each of the single-item node tables 502 and 504. For example, for item 'f,' the frequency count of 0 (from single-item table 502) and the frequency count 3 (from single-item table 504) are summed to form a combined frequency count of 3, as illustrated in the combined single-item frequency table 506.

Based on the frequent patterns (generated, for example, using the item-specific conditional pattern base, such as shown in 402) for each of the frequent items and the combined single-item node tables 506 for each of the frequent items, the processing engine 202 generates association rules, such as association rules in the association rule table 510.

As illustrated in the association rule table 510, association rules include one or more of the following information: an antecedent, a consequent, a confidence, a frequency of the antecedent and a frequency of the antecedent and consequent. For example, the first row of the association rules table 510 includes an antecedent of 'c', a consequent of 'f', a confidence of 0.75, a frequency of antecedent 4 and a frequency of antecedent and consequent 3.

Both the frequent item table 508 and/or the single item tables 502 and 504 may be processed in a distributed manner to an associated processor or processing engine. Thus, tasks may be efficiently distributed among the processors, such as processor(s) 210 or 220, so as not to overwhelm any one individual processor. It is also appreciated that in another embodiment, a single processor or engine may be responsible for processing of such tasks.

Figure 6:
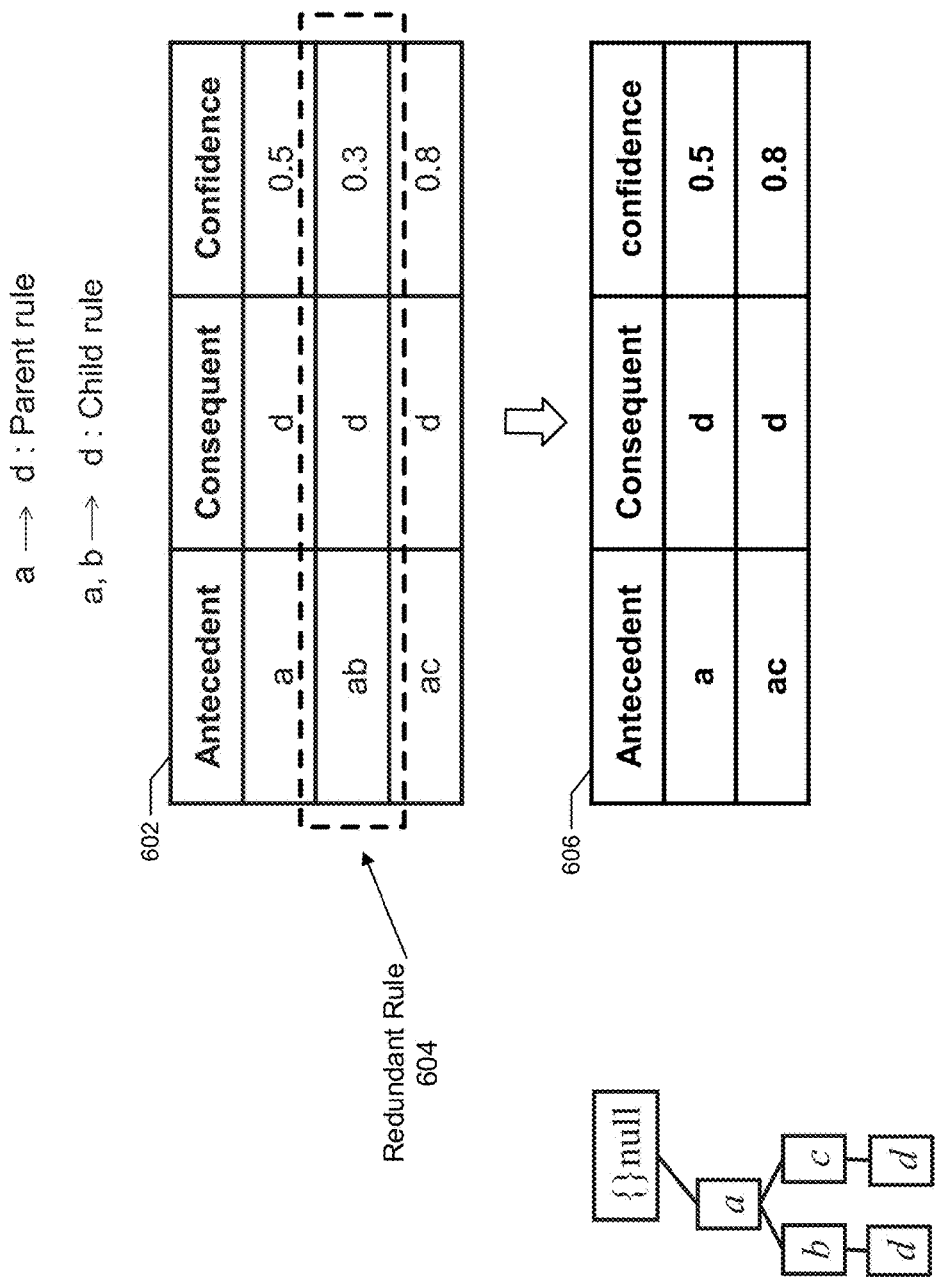
FIG. 6 illustrates an example of redundant rule remove in accordance with disclosed technology.

FIG. 6 illustrates an example of redundant rule remove in accordance with the disclosed technology. Various embodiments of the present invention may be applied to remove and/or modify redundant rules, thereby reducing the size or complexity of the preliminary rule set 602 to form a final rule set 606.

In one embodiment, the process and systems use content-based partitioning logic to partition the data by building a probe structure and associated table (e.g., FP-tree and associated table). Once the data is partitioned, according to content for example, the resulting parts may be grouped and distributed to an associated processor for further processing.

The content-based partitioning logic may be used in a computing system, including shared memory and distributed memory multi-processor computing systems, but is not so limited. Tasks may be efficiently distributed among the processors, such as processor(s) 210 or 220, so as not to overwhelm an individual processor. In other embodiments, the data processing engine 202 and processing element 214 may include a single processor and other components. For example, the process(es) and system(s) described herein can learn association rules directly from the FP-tree to thereby significantly reduce the computational time.

In one embodiment, a child rule is a rule that contains a same consequent as the parent rule but has an antecedent that contains the antecedent of the parent rule as a subset. If a child rule is of lower or same confidence (lift) than the parent rule, then the child rule is a redundant rule and is removed. For example, a parent rule is a→d and a child rule is a, b →d. In the preliminary rule set 602 generated during the mining process, a redundant rule 604 was generated having an antecedent a, b; a consequent d and a confidence of 0.3. Thus, according to the redundant rule, child rule a, b should be removed. Once the redundant rule 604 is removed, the preliminary rule set 602 is updated/modified to generate the final rule set 606.

While FIG. 6 illustrates the above redundant rule example, any number of different redundant rule removal may be employed. For example, in another embodiment, if the redundant rule detector 208C determines that an association rule provides only a trivial association between its antecedent (e.g., (a, b)) and its consequent (e.g., (d)), then the association rule would not be included in the final rule set 606. An example of such a trivial association would occur when the consequent item (e.g., (d)) belongs to a part group specified by an antecedent item (e.g., (a)).

FIGS. 7A-D illustrate flow diagrams for mining data in a database in accordance with the disclosed technology. In the description that follows, the data processing engine 202 may implement the procedures. However, the implementation is not limited to implementation by the data processing engine 202 and any network component (such as those depicted in FIGS. 1, 2 and 11) may be responsible for implementing the disclosed procedures. Additionally, in a non-limited embodiment, implementations can include distributed processing, component/object distributed processing, and parallel processing.

Figure 7A:
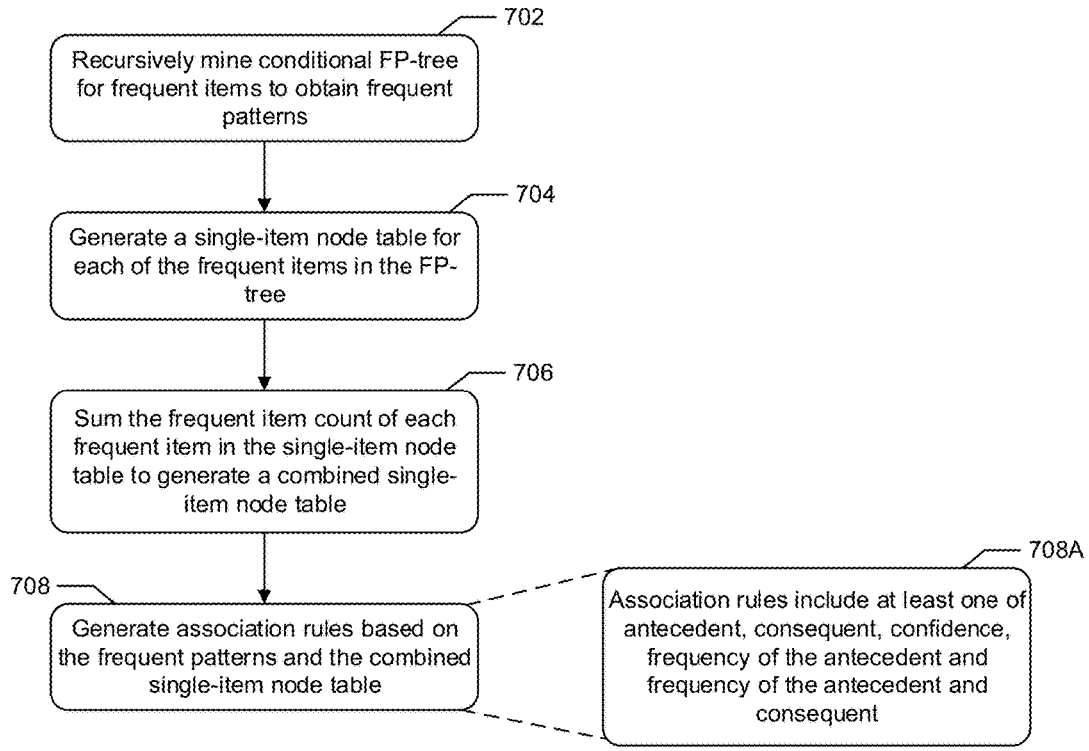
FIGS. 7A-D illustrate flow diagrams for mining data in a database in accordance with the disclosed technology.

With reference to FIG. 7A, at 702, the processing engine 202 recursively mines a conditional FP-tree, such as the conditional FP-tree in FIG. 4, for frequent items of each conditional pattern base for each node in the FP-tree to obtain frequent patterns for each of the frequent items. For example, for an m-conditional pattern base (as depicted in FIG. 4), the conditional FP-tree (including nodes with dashed lines) is recursively mined to obtain frequent patterns (for example, m, fm, cm, am, fcm, fam, cam, fcam) for each of the frequently occurring items.

At 704, the processing engine 202 generates, for each branch in the FP-tree, a single-item node table for each of the frequent items in the FP-tree for which a selected one of the frequent items appears in the node of the branch, as described above in detail with reference to FIG. 5. As discussed, each of the generated single-item node tables 502 and 504 includes a list of all of the frequent items and a corresponding frequent item count.

Once each of the single-item node tables 502 and 504 has been generated at 704, the frequent item count is summed for each frequent item in the single-item node table 502 and 504 to generate a combined single-item node table at 706. Thus, the combined single-item node table 506 stores a total frequency count for each of the frequent items appearing the single-item node tables 502 and 504.

At 708, the processing engine 202 generates association rules (for example, association rules in the association rule table 510) based on the frequent patterns for each of the frequent items and the combined single-item node tables 506, as described above with reference to FIG. 5. As illustrated in the association rule table 510, association rules include one or more of, but not limited to, the following information at 708A: antecedent, consequent, confidence, frequency of the antecedent and frequency of the antecedent and consequent.

Figure 7B:
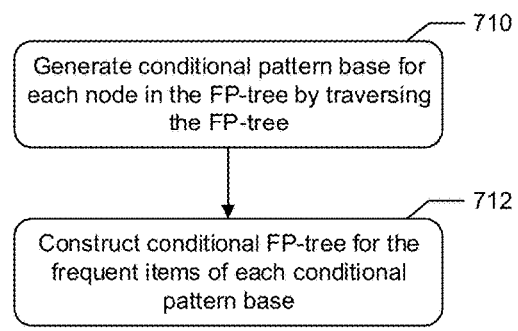

Turning to FIG. 7B, the processing engine 202 generates a conditional pattern base for each node in the FP-tree by traversing the FP-tree at 710. Traversing the FP-tree includes, for example, following node-links for each of the frequent items in the FP-tree, beginning at a root (or head) node, such as node { }null, to obtain the frequent patterns. The frequent patterns may then be calculated by the processing engine 202 for each of the frequent items in a path by counting a prefix sub-path of each of the frequent items in the path, such that the frequency count matches the prefix sub-path count.

For example, with reference to FIG. 4, a conditional pattern base, such as an item m-conditional pattern base (e.g., fca:2, fcab:1), is generated for each node in the FP-tree. From the conditional pattern base constructed during 710, a conditional FP-tree (such as m-conditional FP-tree in 402) in constructed for the frequent items of each conditional pattern base at 712. A detailed description of generating the conditional pattern base and conditional FP-tree may be found with reference to FIG. 4 above.

Figure 7C:
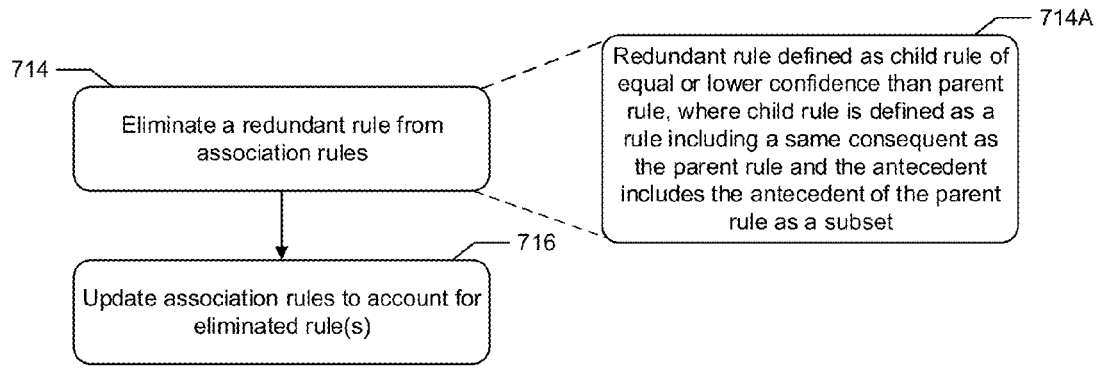

Once association rules have been generated at 708, redundant association rules may be eliminated at 714, as illustrated in FIG. 7C. In one embodiment, processing engine 202 removes redundant rules at 714A by defining a child rule to be of equal or lower confidence than a parent rule, where the child rule is defined as a rule including a same consequent as the parent rule and the antecedent includes the antecedent of the parent rule as a subset (FIG. 6).

At 708, the processing rule updates the association rules to account for the eliminated rules.

Figure 8:
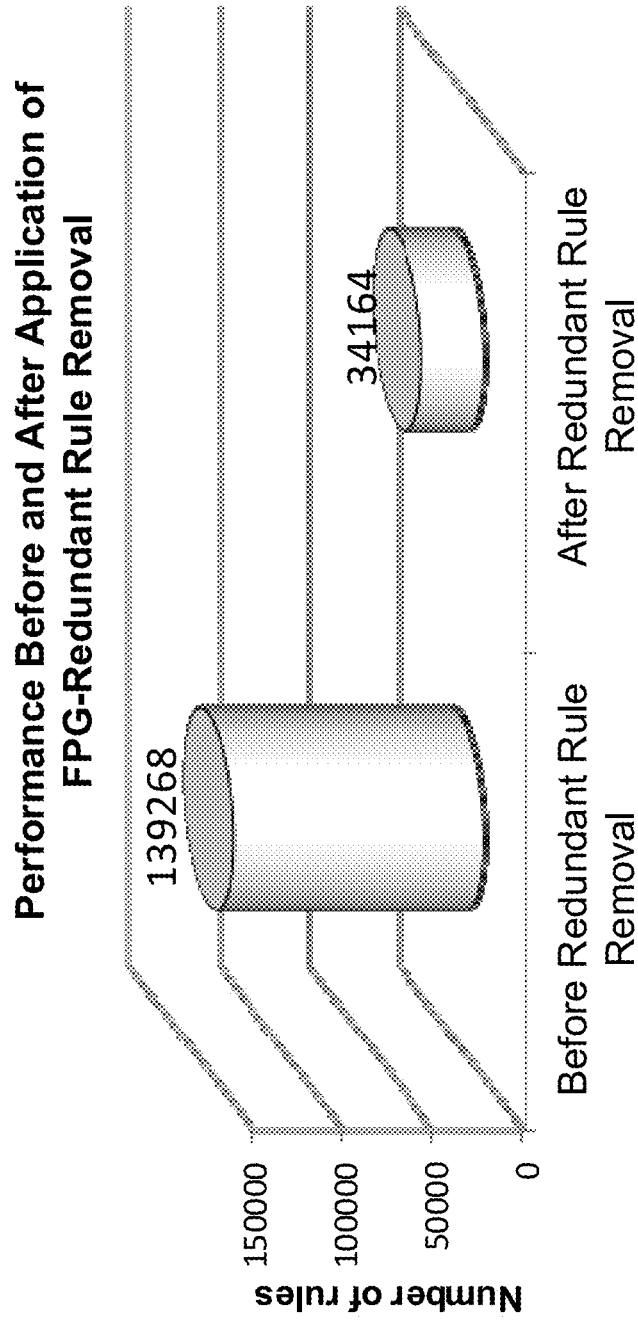
FIG. 8 shows an example graph of the performance when applying redundant rule removal.

To illustrate the efficiency of redundant rule removal (i.e., the reduction in computational time), FIG. 8 shows an example graph of the performance when applying redundant rule removal. In the example of FIG. 8, KQI and KPI transaction data from a single operator act as the dataset to be mined. The graph depicts the number of association rules generated from the dataset (vertical axis), along with the computational affect before and after redundant rule removal. As illustrated, before removal of the redundant rules, 139,268 rules are processed. After removal of the redundant rules, there is approximately a 75% reduction in the amount of rules. Accordingly, the computations after redundant rule removal are reduced to 34,164 rules.

Figure 7D:
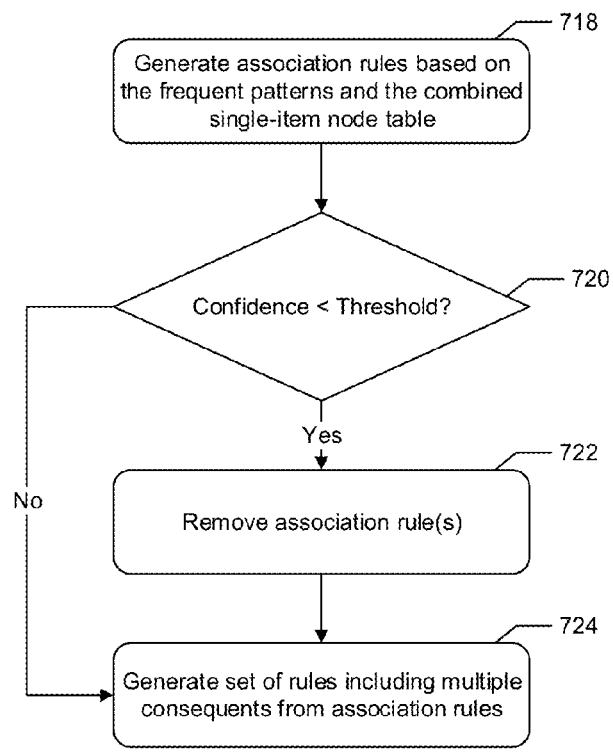

In another embodiment, as illustrated in FIG. 7D, the processing engine 202 may generate association rules containing multiple consequents from association rules containing a single consequent.

At 718, the processing engine 202 generates association rules based on the frequent patterns and the combined-single node tables as discussed above (FIG. 5). At 720, the processing engine determines whether any of the association rules have a confidence that is less than a threshold. If the confidence for any one association rule is less than the threshold, then the association rule is removed from the list at 722 and the process proceeds to 724. Otherwise, if the confidence is greater than or equal to the threshold, then a set of association rules (including multiple consequents) is generated from the association rules (including a single consequent) at 724, thereby resulting in a set of association rules with up to M consequents having a confidence level larger than the threshold.

For example, assume a dataset of KQIs and KPIs and a confidence threshold T. In particular, assume two KPIs: KPI1, KPI2 and two KQIs: KQI1, KQI2, where the target is to calculate the confidence as: P(KQI1, KQI2|KPI1, KPI2) (i.e., the probability of KQI1, KQI2 given KPI1, KPI2). To achieve this target, the chain rule is applied to the dataset. As understood by the skilled artisan, the chain rule (or general product rule) permits the calculation of any member of the joint distribution of a set of random variables using only conditional probabilities. Accordingly, applying the chain rule, we find P(KQI1, KQI2|KPI1, KPI2)=P(KQI1, KQI2, KPI1, KPI2)=P(KQI1|KQI2, KPI1, KPI2)*P(KQI2|KPI1, KPI2)*P(KPI1|KPI2).

Various resource types (e.g., throughput per location), and associated metrics (e.g., a numerical value or a percentage etc,) are examples of data sets received that may be used to calculate the KPIs and KQIs that are mined to form the association rules. The determined association rules may then be utilized in order to provide an understanding of current network performance (e.g., networks in FIGS. 1, 2 and 11) including root cause analysis.

Figures 10, 12:
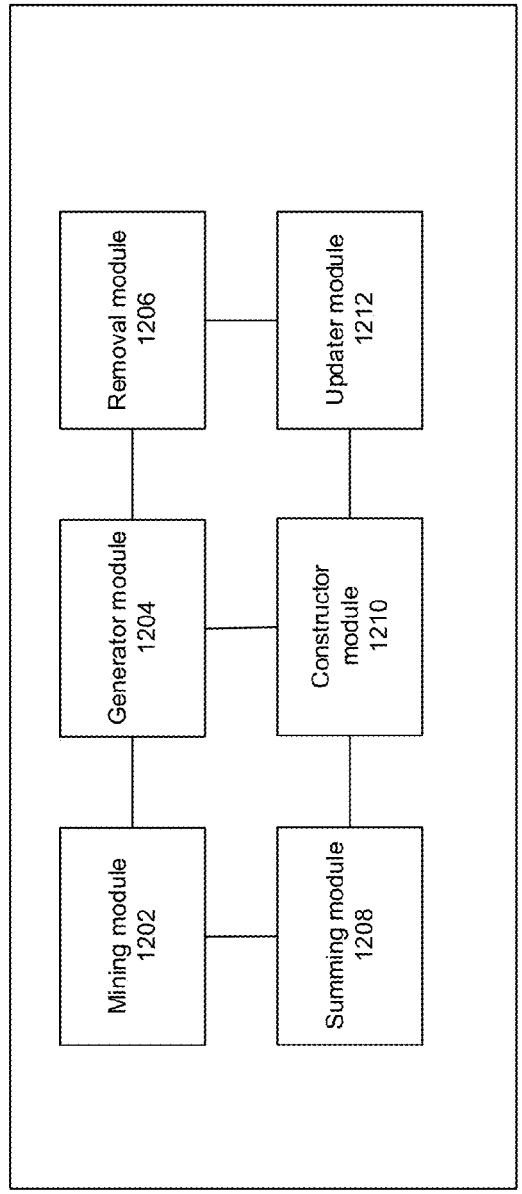
FIG. 10 illustrates an example of high-dimension rules in an association rule table.
FIG. 12 is a block diagram including modules to implement the procedures according to the disclosed technology.

Examples of the association rules generated by the processing engine 202 are disclosed in FIGS. 9 and 10. With reference to FIG. 9, the calculated KQI data set may include various QoS indicators, such as WEBDISPLAYRATE. The calculated KPI data set may include various performance indicators, such as UL_PACKETLOST_RATIO, AVG_D-W_RTT, PAGE_DISPLAY_DELAY, etc. With reference to FIG. 10, multiple KPIs (as opposed to a single KPI in FIG. 10) are utilized to generate the association rules. The number of KPIs may be indicated by the num_Dimension column in FIG. 10.

The association rules disclosed in the tables of FIGS. 9 and 10 may be used to model a relationship between indicators, such as the KQIs and the KPIs, by predicting pattern frequencies and casual relationships between the KQIs and the KPIs. Rule evaluation metrics may also be employed by data processing engine 202 and/or rule engine 208 to calculate, for example, lift, support, and confidence. Using the calculated support, confidence and lift, the data processing engine 202 may predict the probability that one or more KPIs is likely to be the root cause of one or more KQIs from the determined rules and used, for example, to map KPIs to KQIs a probability network (not shown).

Figure 11:
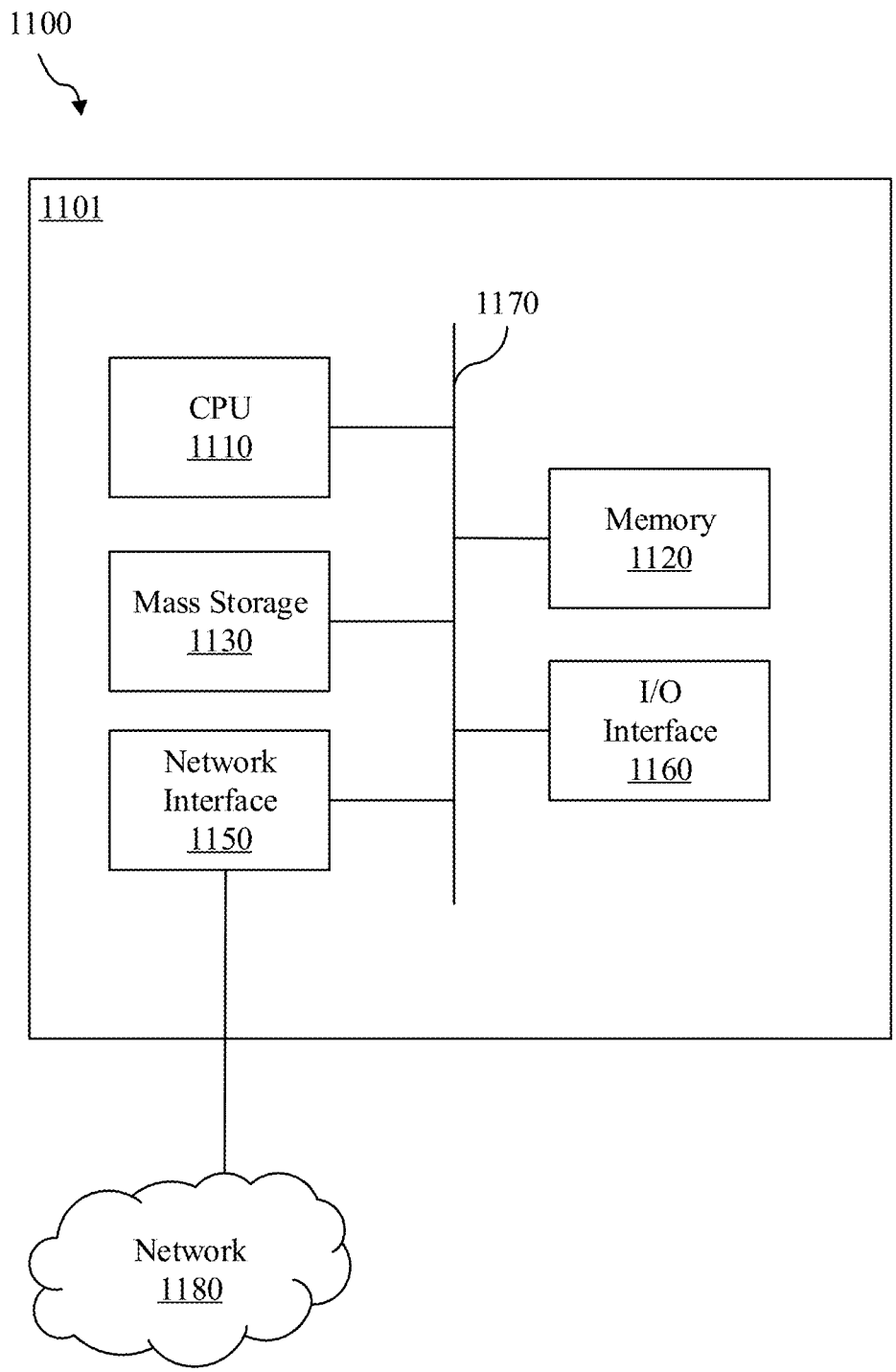
FIG. 11 illustrates a block diagram of a network system that can be used to implement various embodiments.

FIG. 11 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 1100 may comprise a processing unit 1101 equipped with one or more input/output devices, such as network interfaces, storage interfaces, and the like. The processing unit 1101 may include a central processing unit (CPU) 1110, a memory 1120, a mass storage device 1130, and an I/O interface 1160 connected to a bus. The bus may be one or more of any type of several bus architectures including a memory bus or memory controller, a peripheral bus or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

FIG. 12 is a block diagram including modules to implement the procedures according to the disclosed technology. The modules included in the block diagram may be logic and/or software that are designed to implement the disclosed procedures.

The block diagram includes, for example, a mining module 1202 to recursively mine a conditional FP-tree for frequent items of each conditional pattern base for each node in an FP-tree to obtain frequent patterns for each of the frequent items.

Also included is a generator module 1204 that generates, for each branch in the FP-tree, a single-item node table for each of the frequent items in the FP-tree for which a selected one of the frequent items appears in the node of the branch, the single-item node table including a list of all of the frequent items appearing in the FP-tree and a corresponding frequent item count. The generator module 1202 is also responsible for generating association rules based on the frequent patterns for each of the frequent items and the combined single-item node tables. The generator module 1204 may also generate the conditional pattern base for each node in the FP-tree of a frequent itemset by traversing the FP-tree for each frequent item in the frequent itemset and determining transformed prefix paths of each frequent item to form the conditional pattern base.

Removal module 1206 eliminates redundant rules from the association rules, and summing module 1208 sums the frequent item count of each frequent item in the single-item node table formed for each branch to generate a combined single-item node table for each single-item node table of each ranch generated for the selected one of the frequent items.

Constructor module 1210 constructs the conditional FP-tree for the frequent items of each conditional pattern base including an accumulated frequency count for each frequent item in the conditional pattern base, and updater module 1212 updates the association rules to account for the eliminated redundant rule.

There are many benefits to using embodiments of the present disclosure. For example, the disclosed technology can simultaneously learn the frequent item-sets and association rules by constructing the FP-Growth tree, effectively detect and remove a large number of redundant rules, and produce rules with multiple consequents. The disclosed technology is also fully distributed and therefore is amenable to big data platforms, such as Spark, and the disclosed technology may be applied for root cause analysis of KQI anomalies in wireless cellular networks.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for mining data in a database associated with a network, comprising:
   recursively mining, with one or more processors, a conditional frequent pattern-tree (FP-tree) for frequent items of each conditional pattern base for each node in an FP-tree to obtain frequent patterns for each of the frequent items;
   generating, with the one or more processors, a single-item node table for each branch in the FP-tree that includes a node representing a selected one of the frequent items, the single-item node table including a list of all of the frequent items appearing in the FP-tree and a corresponding frequent item count for each of the frequent items;

summing, with the one or more processors, the frequent item count of each frequent item in each of the single-item node tables to generate a combined single-item node table;

generating, with the one or more processors, association rules based on the frequent patterns for each of the frequent items and the combined single-item node tables; and determining a performance level of the network based on the association rules.

2. The computer-implemented method of claim 1, further comprising:

generating the conditional pattern base for each node in the FP-tree of a frequent itemset by traversing the FP-tree for each frequent item in the frequent itemset and determining transformed prefix paths of each frequent item to form the conditional pattern base; and constructing the conditional FP-tree for the frequent items of each conditional pattern base including an accumulated frequency count for each frequent item in the conditional pattern base.

3. The computer-implemented method of claim 2, wherein the traversing comprises:

following node-links for each of the frequent items in the FP-tree, beginning at a root node, to obtain the frequent patterns; and calculating the frequent patterns for each of the frequent items in a path by counting a prefix sub-path of each of the frequent items in the path, such that the frequency count matches the prefix sub-path count.

4. The computer-implemented method of claim 1, wherein recursively mining a single one of the conditional FP-trees results in a complete set of the frequent patterns by enumerating all combinations of the sub-paths in the conditional FP-tree.

5. The computer-implemented method of claim 2, further comprising:

scanning a transaction item database to determine the frequent itemset;

ordering the frequent items in a descending order of frequency; and scanning the transaction item database to construct the FP-tree.

6. The computer-implemented method of claim 1, further comprising:

eliminating a redundant rule from the association rules, and updating the association rules to account for the eliminated redundant rule.

7. The computer-implemented method of claim 6, wherein the association rules include at least one of an antecedent, consequent, confidence, frequency of the antecedent and frequency of the antecedent and consequent, and the redundant rule is defined as a child rule of equal or lower confidence than a parent rule, where the child rule is defined as a rule including a same consequent as the parent rule and the antecedent includes the antecedent of the parent rule as a subset.

8. The computer-implemented method of claim 1, wherein the association rules are learned using a distributed FP-growth algorithm.

9. The computer-implemented method of claim 5, wherein transactions stored in the transaction item database include a first data set including one or more first indicators indicative of a quality of service associated with a source in the network, and a second data set including one or more second indicators indicative of a performance level associated with the source in the network.

10. The computer-implemented method of claim 9, further comprising determining a root cause for degradation of one of the one or more first indicators based on a probability associated with the one or more of the second indicators.

11. The computer-implemented method of claim 7, further comprising:

removing the association rules having the confidence smaller than a threshold; and generating a set of rules including multiple consequents from the association rules, including associated confidence levels, using a chain rule.

12. A non-transitory computer-readable medium storing computer instructions for mining data in a database of a network, that when executed by one or more processors, perform the steps of:

recursively mining, with one or more processors, a conditional frequent pattern-tree (FP-tree) for frequent items of each conditional pattern base for each node in an FP-tree to obtain frequent patterns for each of the frequent items;

generating, with the one or more processors, a single-item node table for each branch in the FP-tree that includes a node representing a selected one of the frequent items, the single-item node table including a list of all of the frequent items appearing in the FP-tree and a corresponding frequent item count for each of the frequent items;

summing, with the one or more processors, the frequent item count of each frequent item in each of the single-item node tables to generate a combined single-item node table;

generating, with the one or more processors, association rules based on the frequent patterns for each of the frequent items and the combined single-item node tables; and determining a performance level of the network based on the association rules.

13. The non-transitory computer-readable medium of claim 12, the one or more processors further performing the steps of:

generating the conditional pattern base for each node in the FP-tree of a frequent itemset by traversing the FP-tree for each frequent item in the frequent itemset and determining transformed prefix paths of each frequent item to form the conditional pattern base; and constructing the conditional FP-tree for the frequent items of each conditional pattern base including an accumulated frequency count for each frequent item in the conditional pattern base.

14. The non-transitory computer-readable medium of claim 12, wherein the traversing comprises:

following node-links for each of the frequent items in the FP-tree, beginning at a root node, to obtain the frequent patterns; and calculating the frequent patterns for each of the frequent items in a path by counting a prefix sub-path of each of the frequent items in the path, such that the frequency count matches the prefix sub-path count.

15. The non-transitory computer-readable medium of claim 12, wherein recursively mining a single one of the conditional FP-trees results in a complete set of the frequent patterns by enumerating all combinations of the sub-paths in the conditional FP-tree.

16. The non-transitory computer-readable medium of claim 12, the one or more processors further performing the steps of:
eliminating a redundant rule from the association rules, and
updating the association rules to account for the eliminated redundant rule.

17. The non-transitory computer-readable medium of claim 16, wherein the association rules include at least one of an antecedent, consequent, confidence, frequency of the antecedent and frequency of the antecedent and consequent, and
the redundant rule is defined as a child rule of equal or lower confidence than a parent rule, where the child rule is defined as a rule including a same consequent as the parent rule and the antecedent includes the antecedent of the parent rule as a subset.

18. The non-transitory computer-readable medium of claim 17, the one or more processors further performing the steps of:
removing the association rules having the confidence smaller than a threshold; and
generating a set of rules including multiple consequents from the association rules, including associated confidence levels, using a chain rule.

19. A device for mining data in a network, comprising:
a non-transitory memory storing data having a number of items and storing a mining application as instructions to mine the data to identify frequent items;
one or more processors in communication with the non-transitory memory, wherein the one or more processors execute the instructions to:
recursively mine, with one or more processors, a conditional frequent pattern-tree (FP-tree) for frequent items of each conditional pattern base for each node in an FP-tree to obtain frequent patterns for each of the frequent items;
generate, with the one or more processors, a single-item node table for each branch in the FP-tree that includes a node representing a selected one of the frequent items, the single-item node table including a list of all of the frequent items appearing in the FP-tree and a corresponding frequent item count for each of the frequent items;
sum, with the one or more processors, the frequent item count of each frequent item in each of the single-item node tables to generate a combined single-item node table;
generate, with the one or more processors, association rules based on the frequent patterns for each of the frequent items and the combined single-item node tables; and
determining a performance level of the network based on the association rules.

20. The device of claim 19, the one or more processors further execute the instructions to:
generating the conditional pattern base for each node in the FP-tree of a frequent itemset by traversing the FP-tree for each frequent item in the frequent itemset and determining transformed prefix paths of each frequent item to form the conditional pattern base; and
constructing the conditional FP-tree for the frequent items of each conditional pattern base including an accumulated frequency count for each frequent item in the conditional pattern base.

21. The device of claim 19, wherein the traversing comprises:
following node-links for each of the frequent items in the FP-tree, beginning at a root node, to obtain the frequent patterns; and
calculating the frequent patterns for each of the frequent items in a path by counting a prefix sub-path of each of the frequent items in the path, such that the frequency count matches the prefix sub-path count.

22. The device of claim 19, wherein recursively mining a single one of the conditional FP-trees results in a complete set of the frequent patterns by enumerating all combinations of the sub-paths in the conditional FP-tree.

23. The device of claim 19, the one or more processors further execute the instructions to:
eliminating a redundant rule from the association rules, and
updating the association rules to account for the eliminated redundant rule.

24. The device of claim 23, wherein the association rules include at least one of an antecedent, consequent, confidence, frequency of the antecedent and frequency of the antecedent and consequent, and
the redundant rule is defined as a child rule of equal or lower confidence than a parent rule, where the child rule is defined as a rule including a same consequent as the parent rule and the antecedent includes the antecedent of the parent rule as a subset.

25. The device of claim 24, the one or more processors further execute the instructions to:
removing the association rules having the confidence smaller than a threshold; and
generating a set of rules including multiple consequents from the association rules, including associated confidence levels, using a chain rule.

* * * * *